Inventors:
Henri J. R. Maget,
Richard J. Roethlein,
by Paul A. Frank
Their Attorney.

Inventors:
Henri J. R. Maget,
Richard J. Roethlein,
by Paul A. Frank
Their Attorney.

Inventors:
Henri J.R. Maget,
Richard J. Roethlein,
by Paul A. Frank
Their Attorney.

United States Patent Office 3,425,874
Patented Feb. 4, 1969

3,425,874
ROTATABLE HYDROPHOBIC ELECTRODE AND
FUEL CELL THEREWITH
Henri J. R. Maget, Swampscott, and Richard J. Roethlein,
North Reading, Mass., assignor to General Electric
Company, a corporation of New York
Filed July 23, 1965, Ser. No. 474,412
U.S. Cl. 136—86                                    12 Claims
Int. Cl. H01m 27/06

ABSTRACT OF THE DISCLOSURE

A rotatable fuel electrode assembly is formed of a sheet portion comprised of a porous electrocatalytic substrate having on opposite sides of the sheet a hydrophobic gas permeable, liquid impermeable film. The edge portions of the sheet are free of film. The liquid electrolyte intimately mingles with the electrocatalytic substrate, being drawn in by capillary action through the film free edge portion only.

Our invention relates to fuel cells and batteries and to electrode assemblies including electrocatalytically active portions adapted to receive sequential loadings of an aqueous electrolyte and a cell reactant.

In order to achieve an electrocatalytic oxidation or reduction of a fuel cell reactant, it is necessary that a three-phase boundary be established between the electrolyte, electrocatalyst, and reactant. In the most common fuel cell configuration, the three-phase interface is achieved by fabricating the electrocatalyst as a component of a thin planar electrode having substantial length and width and minimal thickness. The electrode is positioned in the fuel cell such that one major face is in contact with the reactant and the remaining major face is in contact with the electrolyte. The reactant and electrolyte meet within the electrode to form the necessary three-phase interface with the electrocatalyst. In such fuel cell configuration, the electrode must perform not only the function of electrocatalytic oxidation or reduction but must additionally function as a partition to confine the electrolyte and to prevent direct mixing of the oxidant and fuel reactants on opposite sides of the fuel cell.

While fuel cell configurations including an element serving as both an electrode and partition have proven advantageous, numerous structural limitations are imposed on the electrode by the partition function. Additionally, such cell configurations do not efficiently use all the electrocatalyst comprised in the electrode. The portion of the electrocatalyst adjacent the electrolyte face of the electrode tends to be isolated from the cell reactant while the portion of the electrocatalyst adjacent the reactant may be isolated from the electrolyte, consequently only the fraction of the electrocatalyst in the central porion of the elecrode structure forms a three-phase contact with the reactant and electrolyte.

It is an object of our invention to provide a fuel cell and an electrode assembly capable of efficiently forming a three-phase interface of reactant, electrolyte, and electrocatalyst.

It is another object to provide a fuel cell and an electrode assembly in which the three-phase interface of reactant, electrolyte, and electrocatalyst may be formed at any point within the electrode.

It is an additional object to provide a fuel cell and an electrode assembly in which an electrode is required to perform no extraneous functions.

It is a further object to provide a dynamic fuel cell configuration which may be self-actuated.

These and other objects of our invention are accomplished by providing a fuel cell including means defining separate reactant zones and means confining a body of aqueous electrolyte in contact with each of the reactant zones. The fuel cell further includes electrode assemblies mounted in each of the reactant zones at the interface between the electrolyte and the reactant. At least one of the electrodes is rotatably mounted at the interface with an electrode portion extending into the electrolyte and a remaining portion extending into the reactant. The rotatable electrode assembly is comprised of an electrocatalytically active porous sheet portion having the major exterior surfaces formed of a hydrophobic layer.

Our invention may be better appreciated by reference to the following detailed description considered in combination with the drawings, in which FIGURE 1 is an elevation, partly in section of an electrode assembly;

Figure 1:
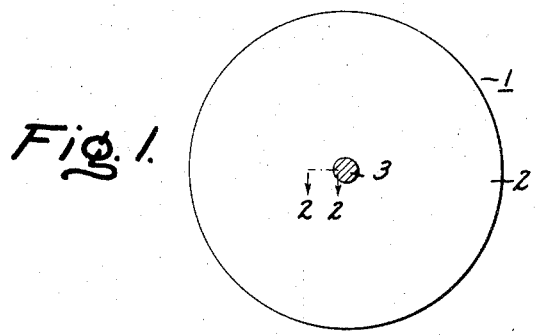

In FIGURE 1 is shown an electrode assembly 1 formed of a sheet portion or disk electrode 2 mounted in electrically conductive relation on a rotatable mounting means 3. As shown in detail in FIGURE 2, the sheet portion is formed of an electrocatalytically active porous substrate 4. As an optional element, a reinforcing and current collecting screen 5 is embedded in the substrate to electronically conduct electricity to the axis 3 from the electrocatalyst. The exterior faces of the substrate 4 are each covered with a thin, hydrophobic gas permeable film 6. It is generally preferred that the edge portions of the substrate be free of film for direct contact with the electrolyte to promote capillary entry of the electrolyte into the substrate.

Figure 3:
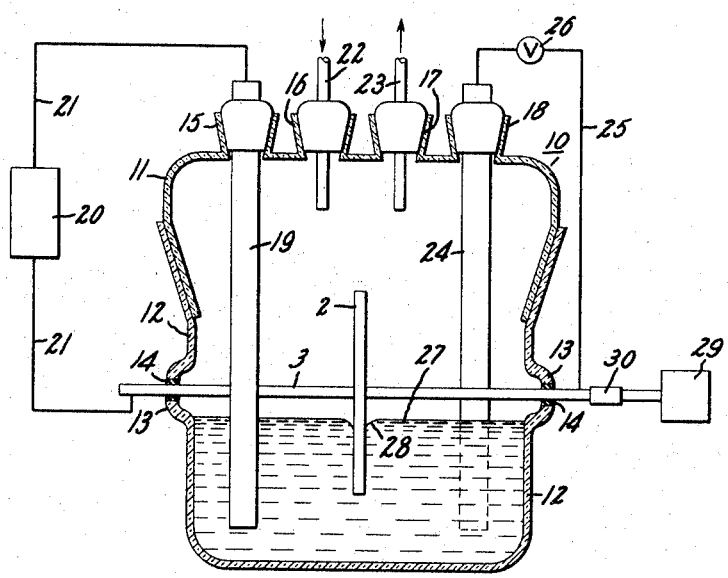
FIGURE 3 is a vertical section of a test cell.

FIGURE 3 schematically illustrates a test cell apparatus 10. A housing is formed by mating upper and lower enclosures 11 and 12. The lower enclosure is provided with opposed ports 13 each having a bearing seal journaled therein. Each of the seals is fitted around axis 3 of an electrode assembly 1.

The upper enclosure is provided with four ground glass sockets 15, 16, 17, and 18. A counter electrode 19 is schematically illustrated mounted in the ground glass socket 15. Any conventional counter electrode may be employed. The counter electrode is connected through a suitable load 20 by leads 21 to mounting means 3 of the electrode assembly. Reactant inlet and outlet conduits are suitably sealed within the ground glass sockets 16 and 17. A reference electrode 24 is suitably sealed within the socket 18 and is connected to the mounting means 3 by an electrical circuit 25 having a voltmeter 26 connected therein.

An aqueous electrolyte fills the lower enclosure to a level 27 and forms a convex meniscus 28 with the hydrophobic exterior surface of the sheet portion 2. The mounting means 3 which rotates the sheet portion within the electrolyte may be connected to any conventional rotator 29. Preferably, the rotator is electrically decoupled from the axis by an insulating drive bushing 30.

Figure 4:
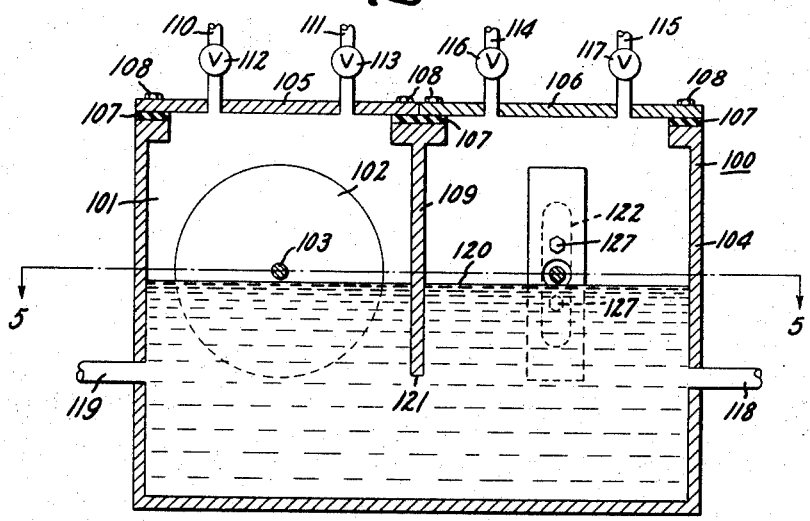
FIGURE 4 is a vertical section taken along line 4—4 in FIGURE 5.

FIGURE 4 illustrates an exemplary fuel cell 100 constructed according to our invention. The fuel cell is provided with two electrode assemblies 101. Each electrode assembly is provided with a plurality of spaced sheet portions 102 mounted in spaced relation on an axis 103.

The electrode assemblies are mounted in a housing formed of an enclosure 104 and upper closure plates 105 and 106 sealingly related to the enclosure by gasket 107 and bolts 108. A partition 109 extends from opposed interior surfaces of the enclosure to divide the upper portion of the enclosure into two separate units. The closure plate 105 is provided with inlet and outlet conduits 110 and 111 controlled by valves 112 and 113, respectively. Similarly, the closure plate 106 is provided with inlet and outlet conduits 114 and 115 controlled by valves 116 and 117.

The enclosure 104 is provided with electrolyte inlet and outlet conduits 118 and 119. The enclosure is filled with an aqueous electrolyte to a level 120 above the lower edge 121 of the partition. The level of each electrode assembly 101 within the housing may be adjusted by controlling the placement of axis 103 in slot 122. Leakage through the slot is prevented by seals 123 and 124. Backing plates 125 and 126 held together by bolts 127 extending through the seals and slots hold the mounting assembly in any desired position. The level of the electrodes with respect to the electrolyte may alternately be controlled by regulation of the reactant pressure acting on the surface of the electrolyte.

Rotating means 128 are connected to each mounting means 103 through an insulating drive bushing 129. Electrical energy is withdrawn from the cell through electrical leads 130 and 131 connected to a load 132. The rotating means are electrically connected to lead 130 at 133 and to the lead 131 at 134.

Figure 6:
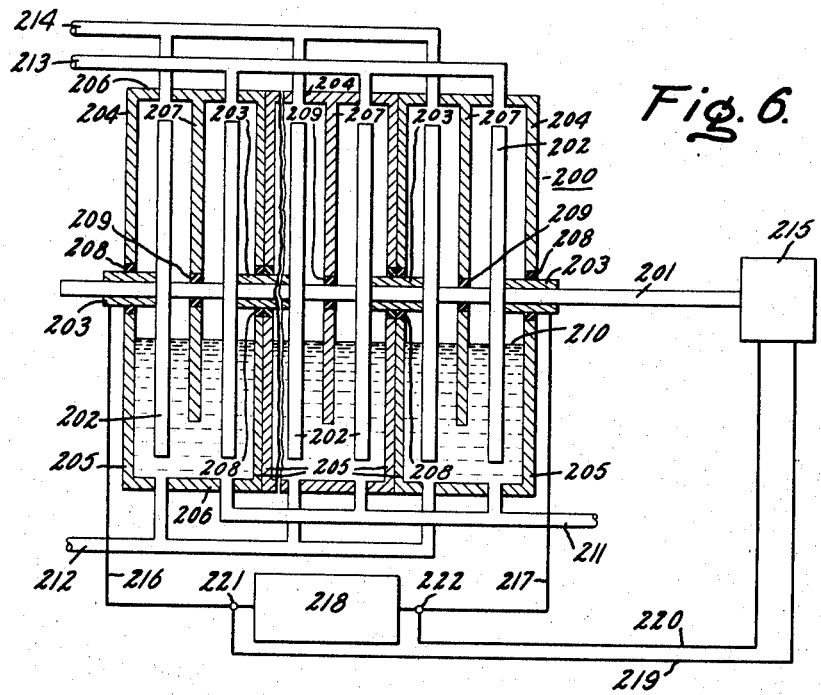
FIGURE 6 is a vertical section of a fuel battery.

FIGURE 6 illustrates a series connected fuel battery 200. For purposes of illustration, the battery is shown comprised of three identical cells 204, although any number of cells could as well be used. Each cell includes two disk electrodes 202. The disk electrodes are connected to the disk electrodes of the next adjacent cell through electrically conductive sleeves 203. The two endmost sleeves serve as battery terminals. The sleeves are mounted on an insulative axis 201 for rotation therewith.

Each cell is formed of a housing, schematically shown, comprised of opposed parallel face walls 205 joined by connecting edge walls 206. Equidistantly between each face wall is mounted a partition 207. The face walls, edge walls, and partitions may be joined at their intersections in sealed relation by any conventional construction technique. Leakage between the face walls and the sleeves 203 is prevented by seal means 208 while leakage between the partitions and insulative axis 201 is prevented by seal means 209.

Aqueous electrolyte is maintained in the cells to a level 210. Electrolyte is supplied to the interior of each cell housing through conduit means 211 and is removed from the interior of each cell housing through conduit means 212. A gaseous cell fuel is supplied to the interior of the cell housing between the face wall and partition on one side through fuel conduit means 213 while gaseous cell oxidant is supplied through conduit means 214 to the opposite side of the partition.

The disk electrodes are rotated by rotating means 215 connected to one extremity of the insulative mounting means. Electrical energy is withdrawn from the cell through electrical leads 216 and 217 connected to the end-most sleeves by suitable connectors, not shown. The leads are connected to an electrical load 218. Electrical leads 219 and 220 extend from the rotating means and are connected to the leads 216 and 217 at 221 and 222, respectively.

The operating characteristics of fuel cells and electrode assemblies formed according to our invention will depend largely on the materials and mode of fabrication of the sheet portion of the electrode assemblies. Any conventional, unitary fuel cell electrode when fabricated as a sheet portion and mounted in electrically conductive relation on a rotating axis will be operative as an electrode assembly. However, unless certain specific structural characteristics are incorporated into the electrode, generally inefficient performance may be obtained. For example, certain non-porous electrode structures may be activated only at the interface of the electrolyte meniscus and the reactant on the surface of the electrode while certain porous electrodes may exhibit low current densities due to excessive ingestion of electrolyte into the electrode thereby inactivating the electrocatalyst.

In order to form efficient sheet portions for electrode assemblies and fuel cells constructed according to our invention, it is generally preferred to employ an electrocatalytic material in particulate form. Any known fuel cell electrocatalyst may be employed. Suitable materials include noble metals of Group VIII series such as rhodium, ruthenium, palladium, iridium, and platinum. Other suitable metals include the other metals of Group VIII, e.g., nickel, cobalt, etc., as well as other metals known to catalytically adsorb gases, e.g., silver, copper, and metals of the transition series, e.g., manganese, vanadium, rhenium, etc. The particulate electrocatalyst may be supported on a conductive particulate substrate formed of tantalum, nickel, carbon, etc. Suitable particulate electrocatalysts are not limited to metals but may be additionally chosen from among various metal oxides known in the art to have electrocatalytic properties, provided such metal oxides are associated with an electrically conductive material, preferably in particulate form. Since electrocatalytic activity is a function of exposed surface, it is generally preferred that the electrocatalyst be employed in finely particulate form, such as metal black, powder, etc. Catalyst powders having a surface area of from 10 to 100 square meters per gram are typically employed.

To prevent the electrocatalyst particles from being inactivated or drowned when the sheet portion of an electrode assembly is submerged in the aqueous electrolyte, it is generally preferred that a hydrophobic material be blended with the electrocatalyst particles. Fluorocarbon polymers having a critical surface tension less than the surface tension of water are generally preferred for this purpose, since the polymer additionally functions as a binder for the electrocatalyst particles to create a unitary structure. Critical surface tension is defined as the value of the liquid surface tension at which liquids spread on a given polymer surface. A full discussion of critical surface tension is provided at page 240, "Surface Chemistry Theory and Industrial Application," by Lloyd I. Osipow, Reinhold Publishing Corporation, New York, 1962. A preferred fluorocarbon polymer is polytetrafluoroethylene (hereinafter PTFE).

A wet-proofing agent such as PTFE may be mixed with the particulate electrocatalyst either in granular form or in the form of an aqueous slurry. The quantity of wet-proofing agent may vary from 0.5 to 50 percent, preferably 5 to 25 percent, by weight of the mixture. In forming an electrode substrate such as substrate 4 in FIGURE 2, the electrocatalyst-polymer mixture may be cast or molded. If desired, a porous or non-porous current collector of any conventional type may be embedded in the mixture. When PTFE is used as a wet-proofing agent for the electrocatalyst, it is necessary to sinter the mixture at temperatures in the range of 350° F. to 750° F. in order to form a unitary mixture. The duration of sintering may be varied widely and will vary somewhat with the sintering temperature chosen. Generally, sintering durations of from 2 to 10 minutes are employed. Since it is generally preferred that the substrate of the electrode sheet portion have a porosity in the range of from 30 to 80 percent by volume, the electrocatalyst-PTFE mixture is generally pressed simultaneously with sintering at pressures in the range of 6500 to 1500 p.s.i. Below approximately 30 percent by volume porosity, the electrode assembly may prove inefficient due to insufficient electrolyte penetration while at porosities above approximately 80 percent it may be difficult to fabricate electrodes having a desired degree of structural integrity. It is, of course, appreciated that any porous substrate will produce a higher current density than a corresponding non-porous substrate.

While the use of a hydrophobic binder in the substrate is desirable, in order to impart a high level of hydrophobicity to the sheet portion, it is necessary to apply a hydrophobic surface film to the major exterior surfaces of the substrate. The film thickness is chosen so as to prevent aqueous electrolyte penetration of the substrate but to allow penetration of a gaseous reactant into the substrate. Accordingly, the minimum film thicknesses which will reliably provide wet-proofing to the substrate are preferred, typically thicknesses from 0.5 to 2 mils. The hydrophobic films are formed of the same general types of materials employed to form the hydrophobic binder. PTFE is the preferred film material. A preferred application technique consists of spraying on the hydrophobic film followed by a brief sintering period. As previously pointed out, the film is not applied to the edge of the sheet portion but only to the faces.

It is generally preferred that the over-all thickness, inclusive of hydrophobic surface film, of the disk electrode range from 5 to 100 mils. Such thickness range allows intimate contact of reactant and electrolyte within the electrode. Of course, larger or smaller thicknesses could be employed in forming the disk electrode, although less than optimum electrocatalyst efficiency may result.

Figure 2:
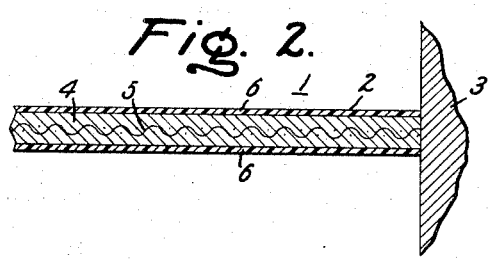
FIGURE 2 is a section taken along line 2—2 in FIGURE 1.

When an electrode assembly of the preferred construction such as illustrated in FIGURES 1 and 2 is mounted in a cell at the interface of a gaseous cell reactant and an aqueous electrolyte, a large three-phase interface between the electrolyte, electrocatalyst, and reactant may be obtained. As a segment of the sheet portion 2 is submerged in the electrolyte by rotation, the electrolyte is drawn into the substrate 4 by capillary action through the exposed edge of the sheet portion or through small cracks or fissures which may be present in the hydrophobic film. Entry of the electrolyte into the substrate along the major surfaces is prevented by hydrophobic films 6. The electrolyte permeates without excessively wetting the electrocatalyst particles in the porous substrate.

As further rotation of the electrode assembly occurs, the segment of the sheet portion is raised above the level of the aqueous electrolyte and into contact with the gaseous electrolyte. Gravitational forces allow the ingested electrolyte to drain back toward the electrolyte reservoir. Simulaneously, the gaseous reactant penetrates the films 6 and enters the substrate along all surfaces. Accordingly, an intimate mixture of reactant and electrolyte is obtained substantially uniformly in the segment of sheet portion. The electrolyte residence within the segment is prolonged, since the gravitational direction is reversed from the time the segment emerges from the electrolyte and the time the segment re-enters the electrolyte. Also capillary action holds a portion of the electrolyte in place.

As the electrode assembly continues to rotate each segment making up the sheet portion of the electrolyte is successively and intermittently charged with electrolyte and reactant. The result is an intimate intermingling of electrolyte and reactant within the substrate producing a large area of three-phase contact and a resulting high current density. The efficiency of any given electrode will be influenced to some extent by the ratio of the sheet portion in the electrolyte zone to the sheet porion in the reactant zone. It is generally preferred that the rotational mounting means of the electrode assembly be mounted at the interface of the electrolyte reactant so that half of the sheet portion will be within the reactant zone and half of the sheet portion will be in the electrolyte zone. The electrode assembly will, of course, be operable so long as a portion lies in each of the zones, although an even ratio in each zone is generally most efficient. The current and potential of the electrode are both directly related to the rotational speed. At lower rotational speeds, small increases in rotation will produce relatively large improvements in electrical performance, although at higher rotational speeds the increases in electrical performance for increases in rotation are relatively small. At above approximately 0.25 revolution per second, electrical performance improves relatively slowly with increases in rotation, or alternately stated, electrical performance is substantially independent of rotational speed.

Figure 5:
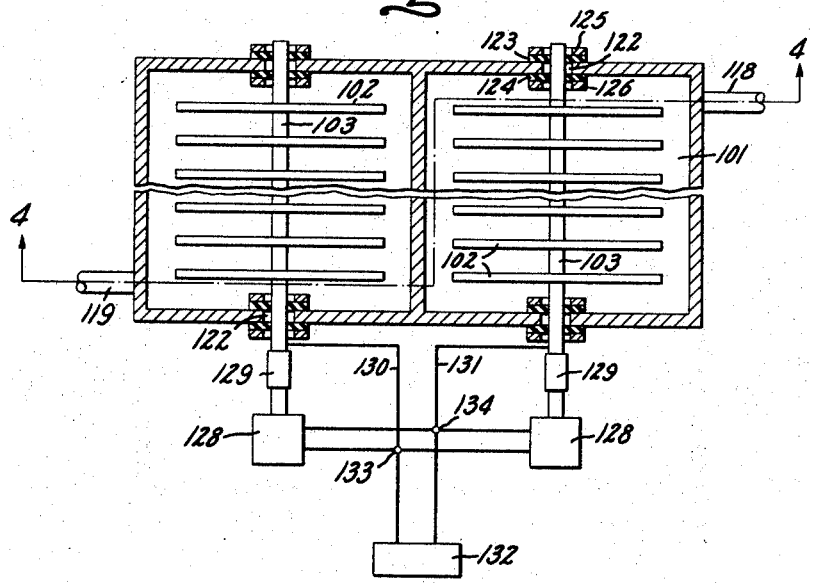
FIGURE 5 is a horizontal section taken along line 5—5 in FIGURE 4.

The operation of fuel cells constructed according to our invention may be appreciated by reference to FIGURES 4 and 5. and aqueous electrolyte is circulated to the housing through inlet conduit 118 and is removed from the housing through outlet conduit 119. Oxidant such as air or oxygen is supplied to the fuel cell through inlet conduit 110. Outlet conduit 111 may be used to purge the cell as it is placed in operation and also to circulate oxidant during cell operation. A gaseous fuel such as hydrogen, propane, or any gaseous hydrocarbon is circulated to the cell through inlet conduit 114. The outlet conduit 115 may be used to purge the cell or to allow circulation of fuel. It is appreciated that either the oxidant or fuel may be supplied to the cell but not circulated by closing the valves 113 and 117 respectively. If operation on air is contemplated, the closure plate 105 may be omitted entirely.

Electrode assemblies 101 are mounted within the cell in the oxidant and fuel zones respectively. The proportion of sheet portion 102 surface area lying in the electrolyte and in the reactant can be adjusted by moving the plates 125 and 126 supporting the mounting means 103. Alternately, the pressure applied to the electrolyte, the fuel, and the oxidant may be controlled to fix the level of the electrolyte within each reactant zone.

To start the electrode assemblies rotating the electrical rotating means 128 are connected to the leads 130 and 134 extending from the mounting means 103 to the electrical load 132. Since a limited three-phase interface is initially present in each sheet portion, a small amount of electrical energy will be generated. If desired, the electrical load 132 may be removed during the initial operation of the cell so as to provide the rotating means with all the electrical energy generated. The rotating means will quickly bring the electrode assemblies to the desired operating speed, and the external load 132 desired to be serviced can again be placed in circuit. The use of separate rotating means for the electrode assemblies is not required. Either or both of the assemblies could as well be rotated by hand. Alternately, both assemblies could by suitable mechanical linkages be rotated by a single rotating means.

The operation of the fuel battery 200 shown in FIGure 6 is similar to that of the fuel cell 100. The cell housings are filled to a level 210 with aqueous electrolyte supplied through conduit means 211. Aqueous electrolyte is continuously circulated within the housings and is exhausted through outlet conduit means 212. Oxidant is supplied to the interior of the cell housings on one side of the partitions 207 through oxidant conduit means 214 and fuel is supplied to the remaining side of the partitions through conduit means 213. The electrodes 202 are rotated by rotating means 215 which derives energy from the fuel battery. Each cell is electrically connected in series through the sleeves 203 to the next adjacent cell such that the potential difference generated across the terminals of the battery is the sum of the potential differences of the individual cells. The fuel battery 200 as shown has a higher voltage but lower current capability than the fuel cell 100.

Our invention may be better understood by reference to the following examples which are intended to illustrate rather than to limit the invention:

In each of the working examples, the disk electrode is formed to a thickness of 10 mils, and electrode potential is measured with reference to a standard hydrogen electrode.

EXAMPLE 1

An electrode sheet portion is formed by mixing platinum black with PTFE in a proportion by weight of 9 parts to 1 part. The mixture is spread on a platinum screen such that the openings in the screen are completely filled. The pasted screen is then placed in a press and subjected to a pressure of approximately 6200 p.s.i. Heisse gauge at 700° F. for a period of 7.5 minutes. The pasted screen is removed from the press and sprayed on each face with 0.10 cc./cm.$^2$ of a 65% by weight aqueous dispersion of PTFE. The sheet portion is then sintered for 1 minute at 660° F.

The sheet portion is cut into the shape of a disk so as to have a surface area on one face of 26 cm.$^2$. The disk is mounted on an electrically conductive mounting means as generally shown in FIGURES 1 and 2.

EXAMPLE 2

An electrode assembly is formed according to Example 1, except that the platinum black-PTFE mixture is pressed to the platinum screen at a pressure of approximately 1500 p.s.i. at 25° C. for a period of 2 minutes.

EXAMPLE 3

An electrode sheet portion is formed by mixing platinum black with PTFE in a proportion by weight of 9 parts to 1 part. The mixture is spread on a platinum screen such that the openings in the screen are completely filled. The pasted screen is then placed in a press and subjected to a pressure of 1500 p.s.i. Heisse gauge at 25° C. for a period of 2 minutes.

The pasted screen is removed from the press and placed in an aqueous solution consisting essentially of 2.00 percent by weight chloroplatinic acid and 0.33 percent by weight PTFE added in the form of an aqueous dispersion. The pasted screen or substrate is employed as one electrode and electrodeposition is conducted at a current density of 20 ma./cm.$^2$ with electrode polarity being reversed each 0.5 minute. Electrodeposition is continued for 4 minutes. The electrodeposition provides a hydrophobic exterior layer of PTFE and platinum as disclosed in our commonly assigned application Ser. No. 444,009, filed Mar. 30, 1965.

The sheet portion is cut into the shape of a disk so as to have a surface area on one face of 26 cm.$^2$. The disk is mounted on an electrically conductive mounting means as generally shown in FIGURES 1 and 2.

EXAMPLE 4

Figure 7:
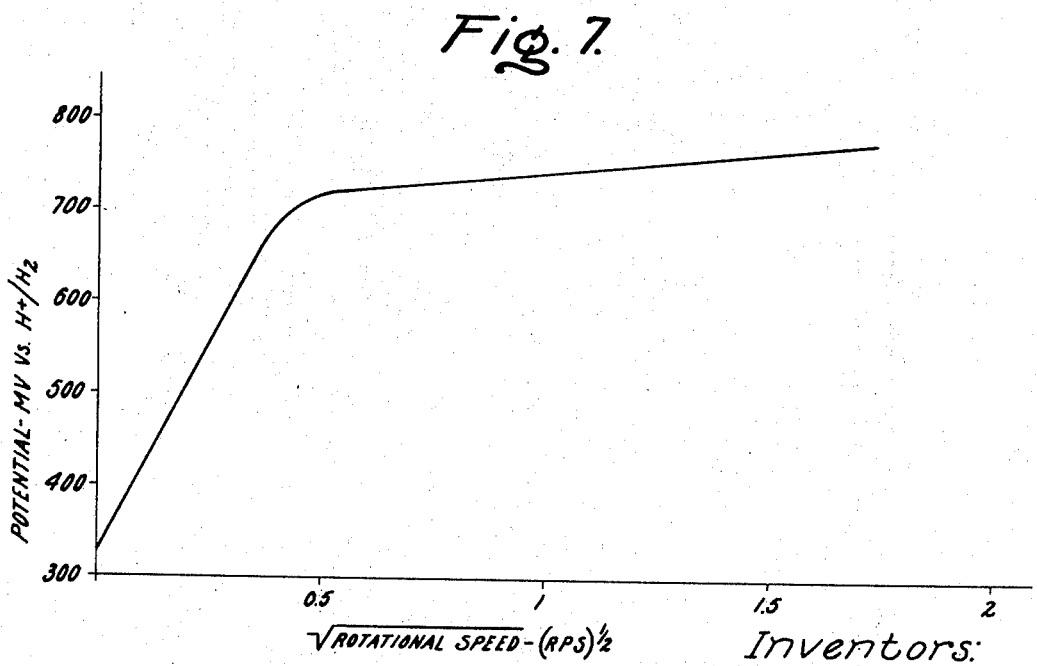
FIGURE 7 is a plot of potential versus the square root of rotational speed.

An electrode asembly of the type described in Example 3 is mounted in a test cell apparatus of the type shown in FIGURE 3. The cell is provided with a 10 N sulfuric acid electrolyte maintained at 25° C. Oxygen at atmospheric pressure is maintained within the cell housing above the electrolyte. The electrolyte level is adjusted so that 40 percent of the surface area of the sheet portion lies immersed in the electrolyte. The cell was operated using standard hydrogen electrodes as counter and reference electrodes. A current density of 35 ma./cm.$^2$ is maintained. Test results are shown in FIGURE 7, which is a plot of electrode potential in millivolts versus the square root of the rotational speed in revolutions per second.

EXAMPLE 5

Figure 8:
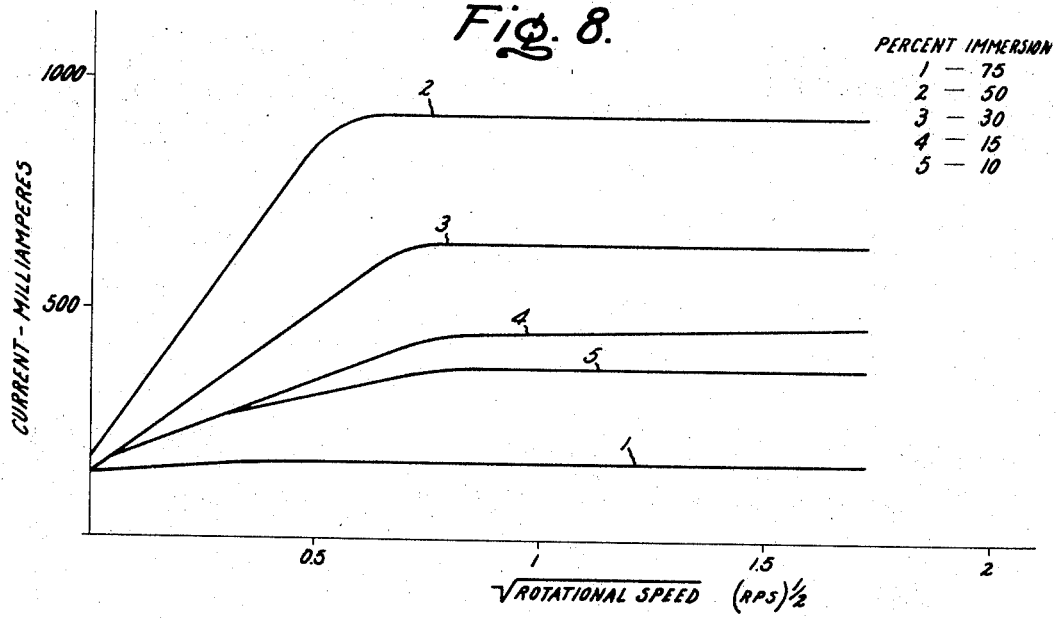
FIGURE 8 is a plot of current versus the square root of rotational speed.

The test cell of Example 4 is operated at a constant potential of 0.6 volt. The electrode assembly is immersed 75%, 50%, 30%, 15%, and 10% within the electrolyte during successive test runs. The relationship of current in milliamperes to the square root of rotational speed in revolutions per second is illustrated in FIGURE 8.

EXAMPLE 6

Figure 9:
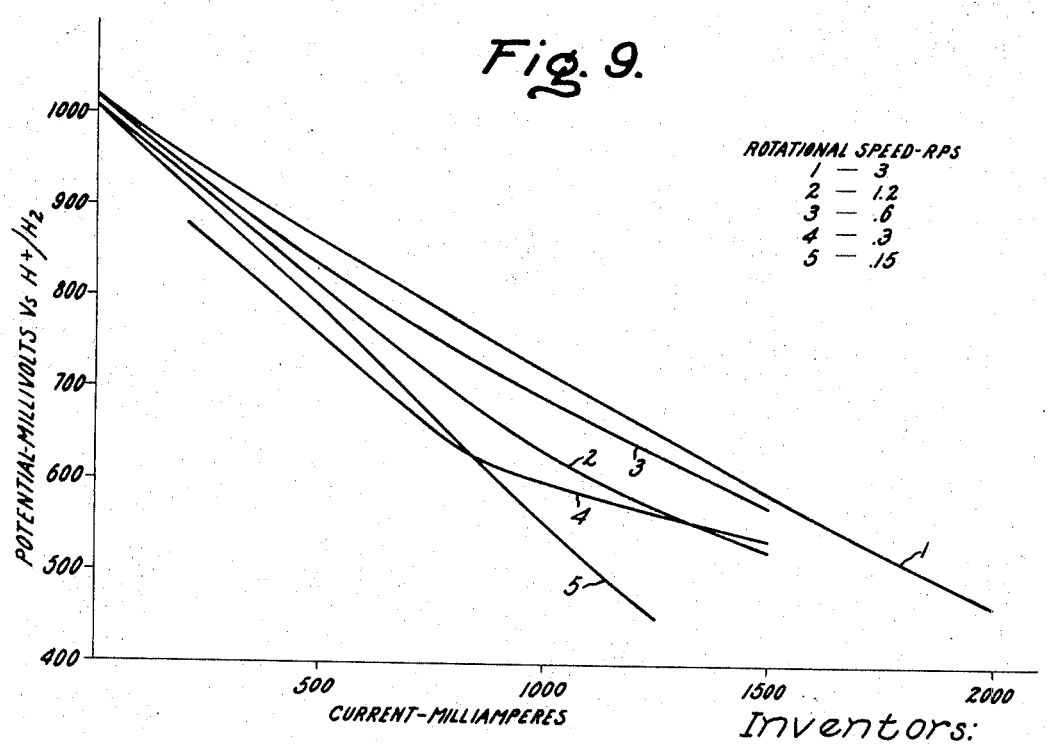
FIGURE 9 is a plot of potential versus current.

The test cell of Example 4 is operated at various potentials and currents as illustrated in FIGURE 9 with an immersion in electrolyte of 50% and rotational speeds of 3, 1.2, 0.6, 0.3, and 0.15 revolutions per second as indicated.

EXAMPLE 7

Figure 10:
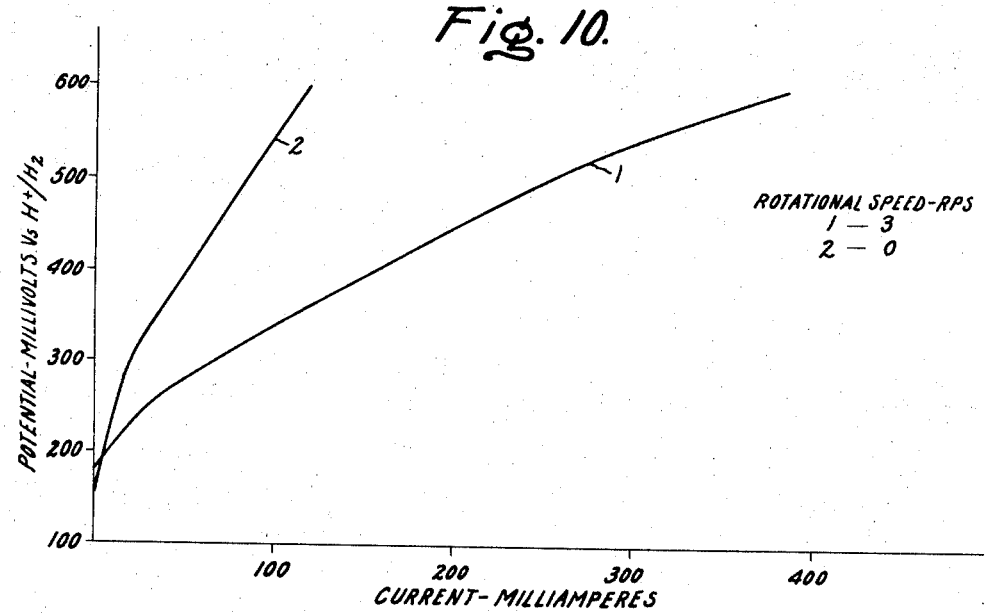
FIGURE 10 is a plot of potential versus current.

An electrode assembly of type described in Example 2 is mounted in a test cell apparatus of the type shown in FIGURE 3. The cell is provided with 90 percent by weight phosphoric acid maintained at 150° C. Propane at atmospheric pressure is maintained above the electrolyte. Thirty percent of the electrode assembly is immersed in the electrolyte. Current-potential curves are taken at rest and then at 3 revolutions per second. The electrode polarizes much more rapidly at rest than when rotated as indicated by the curves shown in FIGURE 10.

EXAMPLE 8

Figure 11:
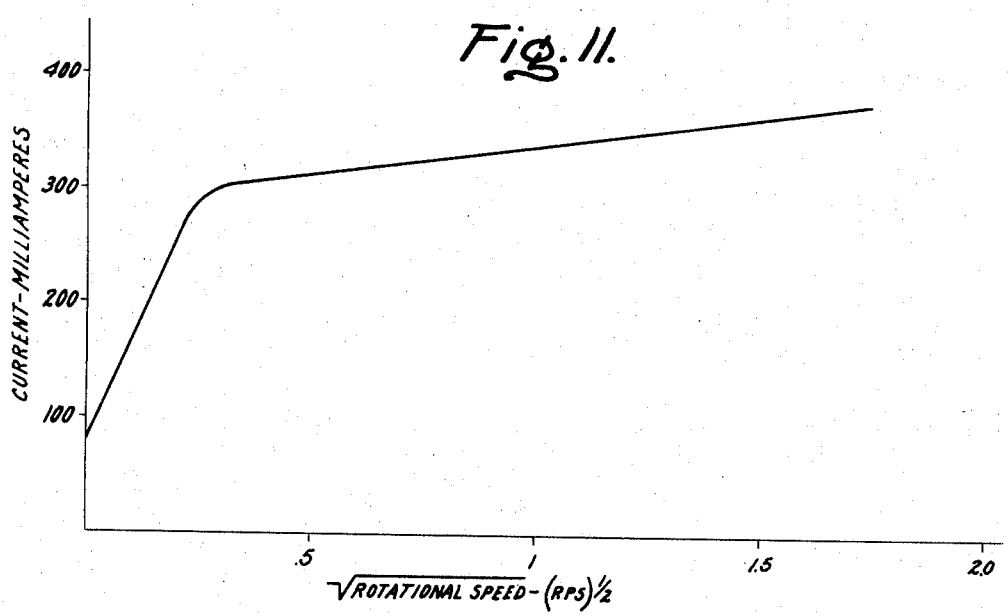
FIGURE 11 is a plot of current versus the square root of rotational speed.

An electrode assembly of type described in Example 1 is mounted in a test cell apparatus of the type shown in FIGURE 3. The cell is provided with 97 percent by weight phosphoric acid maintained at 180° C. Propane at atmospheric pressure is maintained above the electrolyte. The cell voltage is maintained at 0.600 volt. Forty-five percent of the electrode assembly is immersed in the electrolyte. Current in milliamperes versus the square root of the rotational speed in revolutions per second are plotted in FIGURE 11.

While the invention is described with reference to certain preferred embodiments, it is appreciated that numerous modifications will be readily suggested to those skilled in the art. It is accordingly intended that the scope of the invention be determined by reference to the following claims.

What we claim as new and desire to secure by Letters Patent of the United States is:

1. An electrode assembly comprised of
   a sheet portion including a porous electrocatalytic substrate and, covering each exterior face of said substrate, a gas permeable, liquid impermeable hydrophobic film, edge portions of said substrate being free of said hydrophobic film, whereby liquid electrolyte contacting said edge portions may be drawn into said porous substrate by capillary action through said edge portions, and
   means for rotatably mounting said sheet portion.

2. An electrode assembly according to claim 1 in which the sheet portion is a disk.

3. An electrode assembly according to claim 1 in which an electrically conductive current collector is provided within said substrate.

4. An electrode assembly according to claim 1 in which said film on each face is a thin, porous film consisting essentially of a fluorocarbon polymer having a critical surface tension less than the surface tension of water.

5. An electrode assembly according to claim 4 in which the film consists essentially of polytetrafluoroethylene.

6. An electrode assembly comprised of
   a sheet portion including a substrate comprised of from 0.5 to 50 percent by weight of a hydrophobic binder and a particulate electrocatalyst, and a thin, porous hydrophobic film on each exterior face of said substrate, edge portions of said substrate being free of said hydrophobic film, whereby liquid electrolyte contacting said edge portions may be drawn into said porous substrate by capillary action through said edge portions, and
   mounting means extending through said sheet portion in electrically conductive relation to said substrate.

7. A fuel cell comprising
means confining an aqueous electrolyte,
means confining a gaseous oxidant in a first zone in contact with said aqueous electrolyte along a first interface,
means confining a gaseous fuel in a second zone isolated from said first zone and in contact with said aqueous electrolyte along a second interface,
first and second electrode assemblies positioned at said first and second interfaces respectively,
at least one of said electrode assemblies being formed according to claim 1, and
means for mounting at least said one of said electrode assemblies for rotation at said interface.

8. An electrical energy generating unit comprising
means confining an aqueous electrolyte,
means confining a gaseous oxidant in a first zone in contact with said aqueous electrolyte along a first interface,
means confining a gaseous fuel in a second zone isolated from said first zone and in contact with said aqueous electrolyte along a second interface,
first and second electrode assemblies positioned at said first and second interfaces respectively, at least one of said electrode assemblies including a sheet portion traversing said interface and means rotatably mounting said sheet portion with a fraction lying totally within said aqueous electrolyte, said sheet position including a porous electrocatalyst substrate and, covering each exterior face of said substrate a hydrophobic film, edge portions of said substrate being free of said hydrophobic film, whereby liquid electrolyte contacting said edge portions may be drawn into said porous substrate by capillary action through said edge portions,
rotary drive means connected to said mounting means, and
electrical circuit means extending from said first and second electrode assemblies to said rotary drive means.

9. An electrical energy generating unit comprising
a plurality of fuel cells formed according to claim 7, and
means electrically connecting said fuel cells.

10. An electrical energy generating unit according to claim 9 in which each of said electrode assemblies of each of said cells are rotatably mounted and said means rotatably mounting said electrode assemblies is an axis of rotation.

11. An electrical energy generating unit according to claim 9 in which said fuel cells are electrically connected in series.

12. An electrical energy generating unit according to claim 9 in which said electrode assemblies are mounted in parallel relation.

References Cited

UNITED STATES PATENTS

| | | | |
|---|---|---|---|
| 2,951,106 | 8/1960 | Ruetschi | 136—6 |
| 3,115,427 | 12/1963 | Rightmire | 136—86 |
| 3,141,796 | 7/1964 | Fay et al. | 136—86 |
| 3,202,546 | 8/1965 | Rightmire et al. | 136—86 |
| 3,275,475 | 9/1966 | Cohn et al. | 136—86 |
| 3,282,734 | 11/1966 | Rzewinski | 136—86 |
| 3,297,484 | 1/1967 | Nodrach | 136—86 |

ALLEN B. CURTIS, *Primary Examiner.*

U.S. Cl. X.R.

136—162